US006545762B2

(12) United States Patent
Lewis et al.

(10) Patent No.: US 6,545,762 B2
(45) Date of Patent: Apr. 8, 2003

(54) METHOD OF INVESTIGATING VIBRATIONS AND AN APPARATUS THEREFOR

(75) Inventors: Harvey Lewis, Guildford (GB); Andrew Rogoyski, Guildford (GB)

(73) Assignee: Logica UK Limited, Cobham (GB)

( * ) Notice: Subject to any disclaimer, the term of this patent is extended or adjusted under 35 U.S.C. 154(b) by 0 days.

(21) Appl. No.: 09/834,464

(22) Filed: Apr. 13, 2001

(65) Prior Publication Data

US 2002/0024331 A1 Feb. 28, 2002

(30) Foreign Application Priority Data

Apr. 17, 2000 (GB) .............................................. 0009311

(51) Int. Cl.$^7$ .............................................. G01B 11/02
(52) U.S. Cl. ..................................... 356/502; 250/559.4
(58) Field of Search ................................. 356/502, 511, 356/470, 477, 480, 483, 482, 496, 497; 250/559.4, 559.39, 559.22, 216

(56) References Cited

U.S. PATENT DOCUMENTS

| 4,086,808 | A |   | 5/1978 | Camac et al. |
|---|---|---|---|---|
| 4,334,777 | A |   | 6/1982 | Bien et al. |
| 4,659,224 | A |   | 4/1987 | Monchalin |
| 4,777,825 | A |   | 10/1988 | Barr et al. |
| 4,834,111 | A |   | 5/1989 | Khannan et al. |
| 5,192,979 | A |   | 3/1993 | Grage et al. |
| 5,305,084 | A |   | 4/1994 | Doi et al. |
| 5,353,109 | A |   | 10/1994 | Langdon et al. |
| 5,394,233 | A |   | 2/1995 | Wang |
| 5,434,668 | A |   | 7/1995 | Wootton et al. |
| 5,808,743 | A |   | 9/1998 | Stephens et al. |
| 5,883,715 | A | * | 3/1999 | Steinlechner et al. ....... 356/487 |
| 6,008,887 | A |   | 12/1999 | Klein et al. |

FOREIGN PATENT DOCUMENTS

| DE | 31 13089 | 10/1982 |
|---|---|---|
| EP | 0 324 708 | 7/1989 |
| EP | 0 339 625 | 11/1989 |
| EP | 0 769 698 | 4/1997 |
| FR | 1 549 852 | 8/1979 |
| FR | 1 605 217 | 8/1984 |
| GB | 2 173 064 A | 10/1986 |
| GB | 2259 139 A | 3/1993 |

* cited by examiner

Primary Examiner—Que T. Le
(74) Attorney, Agent, or Firm—Townsend and Townsend and Crew LLP (57) ABSTRACT

In order to investigate and analyse vibrations of any object, light from a laser is split with part being emitted to an object and part being mixed with the light reflected from the object to create an interference signal. That interference signal is investigated to derive therefrom a signal representing the vibrations of the object If there is bulk movement of the object, the effect of that bulk movement may impose a popular shift on the reflected light. To eliminate this from the investigation of the vibrations of the object, an estimate of frequency corresponding to the effect of the bulk movement is derived from the signal, and that used to defuse a signal of reduced bandwidth encouraging the frequency due to the bulk movement and also the frequencies of vibration Thus, the vibrations can then be derived and investigated from analysis of that signal of reduced bandwidth.

7 Claims, 4 Drawing Sheets

METHOD OF INVESTIGATING VIBRATIONS AND AN APPARATUS THEREFOR

BACKGROUND OF THE INVENTION

1. Field of the Invention

The present invention relates to the investigation and analysis of vibration. It is particularly concerned with investigating vibration using a laser vibrometer and may be used, for example, to analyse vibrations of vehicles.

2. Summary of the Prior Art

It is already known to analyze the surface vibration of an object such as a vehicle using a laser vibrometer. Vibration of the object's surface can be induced by internal machinery; for example a car's piston engine causes external body panels to vibrate with characteristics governed by the engine rotation speed and number of cylinders, amongst others. A laser beam from the vibrometer is caused to be incident on the object, and laser light reflected from the object is detected, and its frequency compared with the light emitted from the laser vibrometer. Vibrations of the object will cause modulations in frequency in the reflected light, compared with the light generated, and this change can be analysed to investigate the vibration of the object and hence to identify it. Typically laser radars employ an optical heterodyning system to down convert the received signal from optical frequency to radio frequency (RF) for subsequent demodulation and signal processing.

For example, the article entitled "Demodulation Scheme for Vibrometers and Associated Effects on Targets Classification" by B Ruck et al, published in AeroSense '98/3380-23, SPIE Volume 3380 pages 151 to 162 of 1998, discusses the analysis of the output of a laser vibrometer. In that article, it was proposed that the light output from the laser vibrometer was modulated, to generate a modulated change in phase discussed above, and the output from the laser vibrometer was demodulated to be analysed. The article discussed the operation of that demodulation in detail.

SUMMARY OF THE INVENTION

The article by B Ruck et al discussed above assumed that the object, although vibrating, was otherwise stationery. The techniques disclosed in that article cannot be used if there is bulk movement of the object, since the light reflected from the object is then Doppler shifted by an amount proportional to the velocity of the object resolved in the direction of the laser vibrometer. The amount of that Doppler shift is large relative to the vibrations. This prevents successful results being obtained if only the techniques disclosed referred to the article referred to above are used. In this case, it is impractical to perform demodulation on the full receiver bandwidth because of the additional noise which would be included. Moving objects also introduce requirements for locating and tracking the object through space so that the laser beam can be steered onto and maintained on the surface of the object for sufficient lengths of time.

The present invention seeks to provide an apparatus and method for analysing vibrations using a laser vibrometer, in which it is possible to detect and analyse vibrations of an object independent of bulk movement of that object, At its most general, the present invention proposes that an estimate is derived of the effect of the bulk movement of the object on the signal, and then that estimate is used to determine a range of frequencies which are analysed in order to detect the vibration.

In effect, the bulk movement of the object means that signals from the object derived from the reflected light detected have a potentially wide bandwidth in which vibrations could occur, but that estimate of the movement is used to enable the bandwidth to be reduced to a manageable size.

There are many techniques which may be used to derive the estimate of the effect of the bulk movement of the object. In general, iterative methods are used in which the estimate of the current movement of the object is obtained from one or more previous estimates of that movement, which predictions are themselves derived from the signals from the vibrometer. Preferably, in order to minimise processing, techniques are used in which one estimate is derived using only the information from the immediately preceding estimate.

It should also be noted that, since the present invention is concerned with analysing vibrations of an object, when that object may be moving, it can be assumed that successive estimates of the movement will vary in a continuous way. Values such as position, velocity and acceleration will vary smoothly, rather than in a step-wise manner. This enables limits to be put on the range of possible values from one estimate to the next, simplifying processing.

Thus, the present invention may be considered be an iterative kinematic tracking and prediction arrangement, in that it makes use of iterative techniques, assumes the movement of the object follows rules of behaviour, and seeks to track the changes in movement of the object using a predictive method which is tested against the actual behaviour.

For example, the mathematical techniques known as Kalman filters may be used. At regular time intervals, measurements are made, using information derived from the vibrometer signals, which are used to modify the current estimate of the "state" of the object, namely its movement. Kalman filters use a recursive algorithm, and so the complete history of the object does not need to be stored. This makes it suitable for real-time systems.

However, the present invention is not limited to the use of Kalman filters. For example, other estimates of the "state" of the object may be used using the mathematical techniques known as alpha-beta tracker, path-following methods graph-theory, hidden-markov models, bayesian techniques, and stochastic resonance.

Once a suitable estimate of the effect of the bulk movement of the object has been determined to enable a suitable bandwidth to be investigated for the effect of the vibrations, then the subsequent analysis of those vibrations may be on the basis of the techniques disclosed in the article referred to above.

Thus, the present invention may provide a method of investigating vibrations of an object comprising:
  generating coherent laser energy and causing some of the laser engergy to be emitted towards to object;
  detecting some of said emitted laser energy which is reflected from the object;
  causing other of said generated laser energy to be mixed or interfere with the laser energy reflected from the object;
  generating a signal corresponding to the interference thus caused; and
  analysing the signal to derive therefrom a further signal representing the vibrations of the object;
  wherein the signal is analysed to derive therefrom a frequency relating to the bulk movement of said object, another signal is derived from said signal which is of restricted bandwidth relative to said signal, said restrictive bandwidth encompassing said frequency and also encompassing the frequencies of vibration of said object, and said further signal is derived from said another signal.

The present invention may also provide an apparatus for carrying out the method referred to above.

Preferably, the predetermined frequency range is of the order of ±10 kHz.

Preferably, the analysis to derive said successive values using iterative methods, and more preferably an iterative method in which one estimate of the value is derived using information from immediately preceding iteration, and not from information derived from earlier iterations.

Preferably, the laser light which is generated is modulated at a predetermined modulated frequency, This ensures that when the laser beam reflected from the target and the internal reference beam are mixed, there is a component at a frequency that can be processed. This additional modulation is included so that even when the Doppler shifts due to bulk movement of the object are negative and substantial, the resulting frequency output is still positive since negative frequencies cannot readily be represented by the vibrometer detector where negative Doppler shifts due to bulk movement will never be encountered, and then the additional modulation is not necessary , this may be the case when the sensor is always moving very rapidly toward the object.

BRIEF DESCRIPTION OF THE DRAWINGS

An embodiment of the present invention will now be described in detail by way of example, with reference to the accompanying drawings, in which.

DETAILED DESCRIPTION

Figure 1:
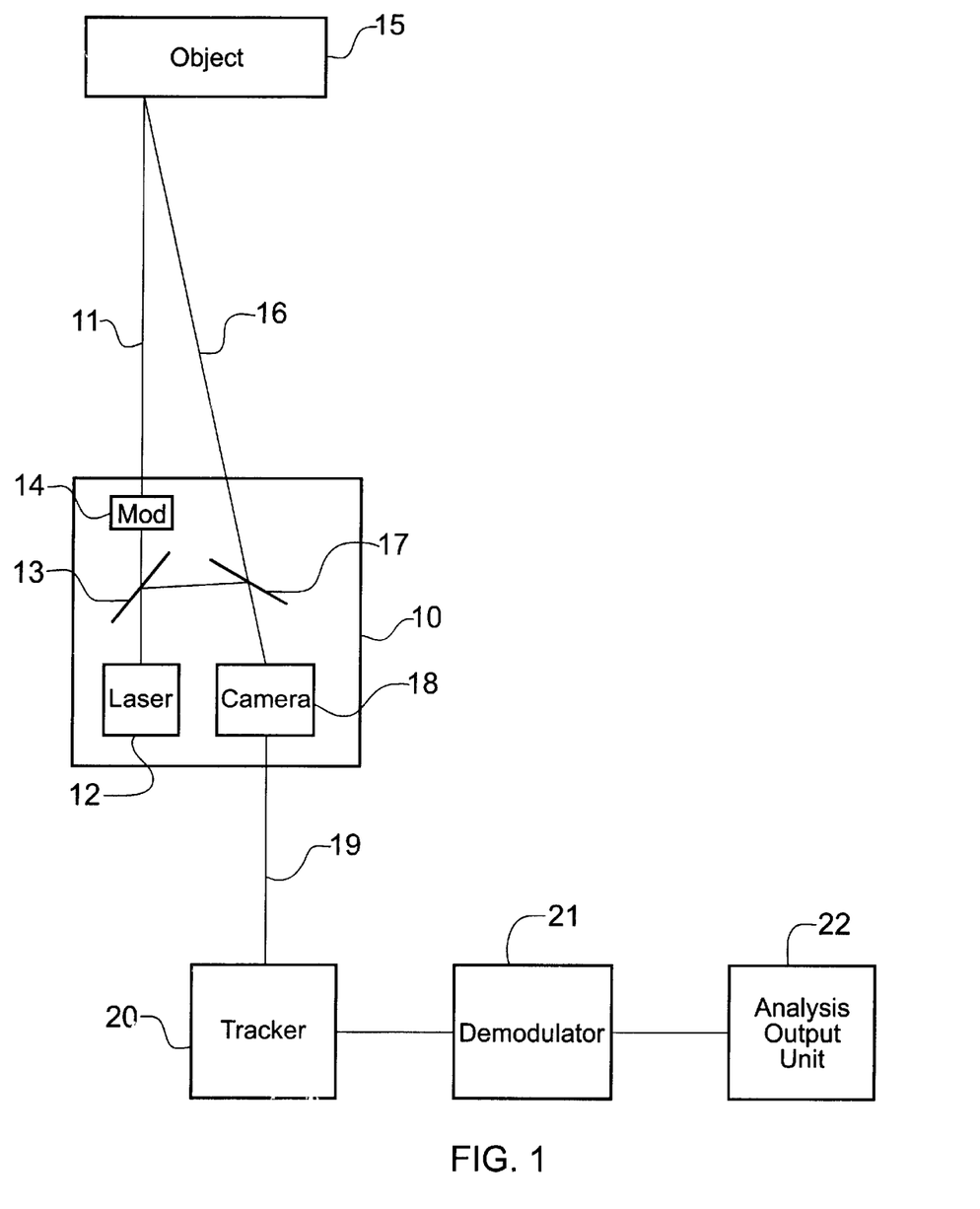
FIG. 1 is a block schematic view showing an apparatus for analysing vibrations being an embodiment of the present invention.

Referring first to FIG. 1, a laser vibrometer 10 generates an output beam 11 from a laser source 12. The output beam 11 passes through a first beam splitter 13 and a modulator 14 and is incident on an object 15 such as a vehicle. Laser light 16 reflected from the object 15 passes via a second beam splitter 17 to a detector 18 such as a camera. The beam splitters 13, 17 are arranged so that laser light reflected at the first beam splitter 13 passes to the second beam splitter 17, and is then reflected to the detector 18 together with the beam 16 reflected from the subject 15 so that interference between the two beams is detect by the detector 18.

To achieve satisfactory beam mixing at the camera 18, the first beam splitter 13 needs to reflect about 0.1% of the light it receives to the second beam splitter 17, whereas the second beam splitter 17 should mix the light of the two beams which are incident on it in at approximately even ratios. This is to take into account the reduction in light intensity due to the passage of the beams to and from the object 15, and also the light lost at the surface of the object 15.

As was previously mentioned, the beam 11 is modulated by the modulator 14. Preferably, this modulator 14 modulates at eg 90 MHz, so that a similar modulation should appear on the output 19 of the detector 18, with output 19 being an electronic analogue signal corresponding to variation of the light received at detector 18.

It should be noted that the structure of the laser vibrometer 10 is in itself known, and are discussed in: eg. the article entitled "Ground-based Laser Radar Measurements of Satellite Vibrations" by K. I. Schultz et al in Applied Optics, Vol. 31, Number 36 of Dec. 20, 1992; the article entitled "Removing platform vibration noise from a radar vibration sensor" by T. A. Sturm et al in Optics & Laser Technology, Volume 27 No 5 1995; the article entitled "Coherent laser radar for vibrometry: Robust design and adaptative signal processing" by I. Renhorn et al in SPIE volume 2472 1995; and the article entitled "Robust coherent laser radar design and signal processing for vibrometry" by M. Millnert et al in SPIE volume 2748.

Figure 2:
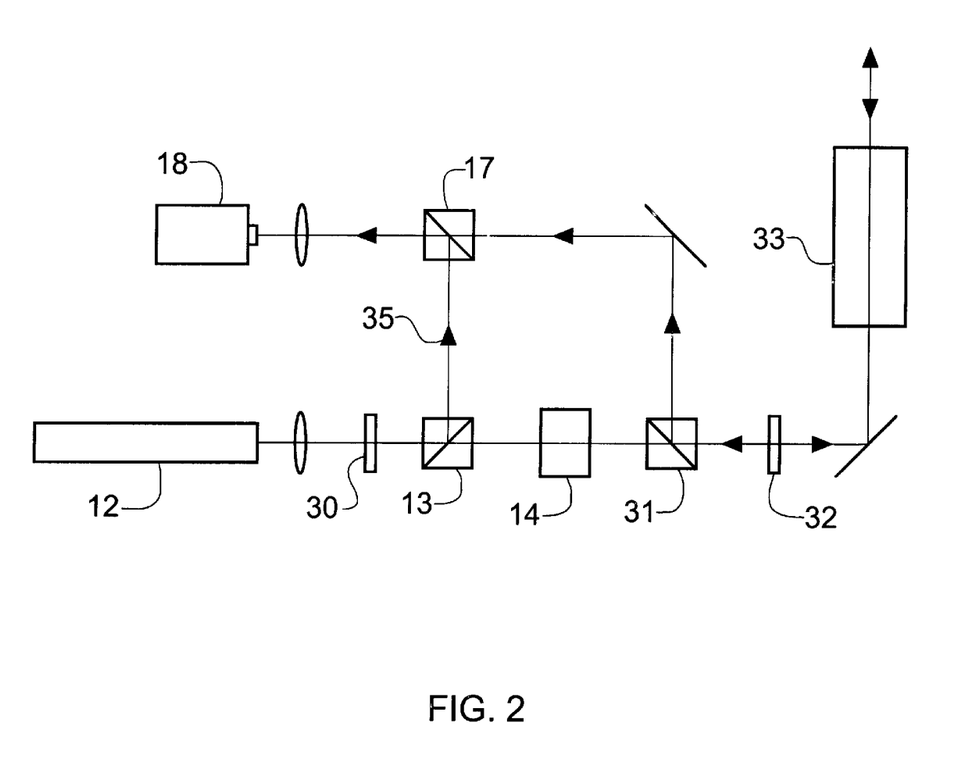
FIG. 2 shows that laser vibrometer of FIG. 1 in more detail.

The structure of the laser vibrometer 10 will now be described in more detail with reference to FIG. 2.

Laser vibrometers can either have separate transmit ad receive optics (bi-static) or have optics common to both transmission and reception of the laser beam (mono-static). FIG. 2 illustrates the optical layout of a typical mono-static, single laser source (homodyne) laser vibrometer and corresponds to the laser vibrometer 10 of FIG. 1.

In this typical mono-static arrangement, a half-wave plate (HWP) 30 converts the coherent laser light into vertically polarized light and then a portion 35 of the laser power is extracted by the first beam splitter 13 being a polarizing beam splitter (PBS). This portion 35 is used as a local oscillator in a subsequent mixing process. The remaining laser output is passed through the modulator 14 which imparts a frequency offset onto the optical beam The modulator 14, or "Bragg Cell" is a device for frequency shifting and/or amplitude modulating optical waves. It usually consists of a piezoelectric transducer bonded to a birefringent crystal. When the transducer is excited by an applied radio frequency (RF) signal acoustic waves are generated in the cell. The propagating acoustic wave produces a periodic modulation of the index of refraction. This provides a moving diffraction grating which will diffract and Doppler-shift portions of the incident optical beam. The intensity of the acoustic wave determines the modulation efficiency, while the optical frequency of the modulated waves is given by the sum of the acoustic frequency and the optical input frequency.

In a mono-static optical duplexer, where the laser beam is transmitted using some of the same equipment used for the reception of the reflected beam, the optics arrangement typically consists of a further beam splitter 31 and a quarter wave plate (QWP) 32. The outgoing, vertically polarized transmit beam is converted to a right-hand circular polarisation by the QWP 32, and then passes through either collimating or focussing optics 33. In an optical system where a beam is transmitted or received, telescope optics are generally needed to produce the beam divergence appropriate to the operating range and for correct beam pointing. In a bi-static system, where there are separate transmit and receive optics, the telescope optics should be matched so that the changes produced by the transmit optics are reversed by the receive optics.

The backscattered energy is collected by the collimating optics 33 and, after passing through the QWP 32 once more, the polarization is converted to vertical. The vertically polarized signal field is then diverted towards the detector via the further beam splitter 31.

The local oscillators (LO) formed by beam portion 35 and return signal fields are combined in the second beam splitter 17 being a non-polarizing beam splitter and they are subsequently focussed on the detector 18. The reason for this mixing is that the radiation reflected from the moving target is modulated by surface vibrations and is at optical frequency. This is usually too high for ordinary electronics to process and so it is shifted down to a more manageable frequency by the process of heterodyning. In a single-source system, the return beam is combined with the LO beam from the same laser. The two beams differ in frequency by an amount equal to that imposed upon the transmit beam by the AOM. A component is produced in the detector output which has a frequency equal to the difference between the LO and transmit frequencies and which, in principle carries the modulation produced by the target surface motion. This component is known as the intermediate carrier frequency (ICF) and can be isolated by filtering.

LO beams can also be provided by secondary laser sources, However, for long range detection the power of the LO should be much less than that of the transmit beam as it leaves the laser since the strength of the return signal is always much weaker.

The signal 19 will vary depending on three factors. The first is the modulation due to the modulator 14. The second is that due to any surface vibration of the target 15, the third is that due to any bulk movement of the target 15. As previously mentioned, the Doppler shift induced by bulk movement can be several orders of magnitude higher than the Doppler shifts resulting from vibrations. The latter typically have bandwidths less than 10 kHz, whilst shifts induced by bulk movement of the object may have bandwidths from 0 Hz to several tens of MHz.

Assume now that the laser vibrometer 10 is an offset heterodyne laser vibrometer.

The output s(t) from such a heterodyne laser vibrometer can be described by the FM equation:

$$s(t) = A(t)\cos\left[2\pi f_c t + 2\pi \int_{-\infty}^{t} m(\tau)d\tau\right] + n(t) \quad \text{Equation 1}$$

where A(t) is a time-dependent amplitude modulation (e.g. arising from speckle, own-platform noise etc), $f_c$ is the carrier frequency (Hz) introduced by an acousto-optical modulator and n(t) is an additive noise term, which will be neglected. The speckle also introduces a time-dependent phse modulation which is not considered. The m(t) is related to the Doppler shifts induced by the vibration (hereinafter micro-Doppler shifts) by:

$$m(t) = \frac{2}{\lambda} v(t) \quad \text{Equation 2}$$

where v(t) represents the vibration velocity of the target in line-of-sight of the sensor and λ is the wavelength of the laser. It is the quantity m(t) that contains the vibration signature of the object, and this can be recovered through demodulation. The complex representation of Equation 1 is given by:

$$z(t) = A(t)\exp\left(j2\pi f_c t + j2\pi \int_{-\infty}^{t} m(\tau)d\tau\right) \quad \text{Equation 3}$$

or equivalently:

$$z(t) = A(t)\cos\left(2\pi f_c t + 2\pi \int_{-\infty}^{t} m(\tau)d\tau\right) + \quad \text{Equation 4}$$
$$A(t)j\sin\left(2\pi f_c t + 2\pi \int_{-\infty}^{t} m(\tau)d\tau\right)$$

with I(t) and Q(t), the in-phase and quadrature-phase components respectively, given by:

$$I(t) = A(t)\cos\left(2\pi f_c + 2\pi \int_{-\infty}^{t} m(\tau)d\tau\right) \quad \text{Equation 5}$$

$$Q(t) = A(t)\sin\left(2\pi f_c + 2\pi \int_{-\infty}^{t} m(\tau)d\tau\right) \quad \text{Equation 6}$$

As an initial input to the Doppler tracking method it is assumed that the raw signal from the laser radar is available as digital samples of I-Q data. The laser radar signal can be visualised using a time-frequency representation (TFR): A class of time-frequency, shift-invariant, quadratic TFRs exists, generally known as the Cohen class, of which the Choi-Williams distribution and spectrogram are particular instances. The general class can be described by:

$$C_s(t, f; \Phi) = \quad \text{Equation 7}$$
$$\int_t \int_v \int_\tau \Phi(v, 2\tau) e^{j2\pi v(t-\tau)} z(t + \tau/2) z^*(t - \tau/2) e^{-j2\pi f \tau} dt dv d\tau$$

where Φ(V, τ) is a kernel function, t is the time lag and n is the frequency lag.

While such a spectrogram is not as sophisticated as other TFRs for example the Wigner-Ville or Choi-Williams representations, it is computationally less intensive and is adequate for resolving signals of interest The impact of movement of the object 15 on the frequency of the received laser radar signal (beam 16) is considerable:

$$M(t) = \frac{2(v_2(t) - v_1(t))}{\lambda} \quad \text{Equation 8}$$

Where M(t) is the Doppler shift in Hz due to the bulk movement of the object is (the bulk Doppler shift) which can be considered to be applied to the carrier frequency, $V_1(t)$ is the bulk velocity vector of the object and $V_2(t)$ is the bulk velocity vector of the sensor platform.

If the laser 12 is a standard $CO_2$ source emitting at a wavelength of 10.6 μm for examples then according to Equation 8 a bulk velocity of just 1 $ms^{-1}$ gives rise to a Doppler shift of approximately 189 kHz, whereas surface velocities on the vibrating object are not expected to exceed 0.05 $ms^{-1}$, which is equivalent to a bandwidth of approximately 10 kHz, in most cases.

A further complicating factor is introduced by the combination of distance between the laser vibrometer 10 the object 15 and the divergence of the laser beam: both govern the illuminated area on the object's surface. Reflections from the surface of the object may give rise to a number of independent signals, for example caused by rotating parts or independently moving surfaces or components, and the probability of this occurring increases as the illuminated area increases. On the whole, each signal should be Doppler shifted by a similar bulk amount, but it should be considered that different parts of the object's surface could be moving in different directions, for example via rotation, and the total signal received by the sensor may therefore be made up of multiple FM components.

The "capture effect" observed in conventional demodulation systems, where one signal only tends to dominate the output if it is slightly higher in power than another, may to some extent negate the impact of multiple components. However, if the received components show significant variation in power over time, then the demodulator output may trip from one signal to the next and the overall characteristics of the surface vibration may be lost in the new noise which is added. 'Soft' demodulation techniques use algorithmic methods to identify the instantaneous frequency (IF) of an FM signal and these methods are less likely to be subject to the "capture effect" and can go some way towards dealing with multiple components.

The signal 19 from the laser vibrometer 10 is then passed to a tracking unit 20 which seeks to track the effect on the signal 19 of the bulk-shift in the variation due to the modulator 14 arising from the bulk movement of the object 15, the variation of that shift with time, and then to convert the signal 19 to a bandwidth suitable for demodulation which encompasses the micro-Doppler shift due to the vibration of object 15. The aim of this is to increase the carrier-to-noise ratio to improve subsequent processing.

Figure 3:
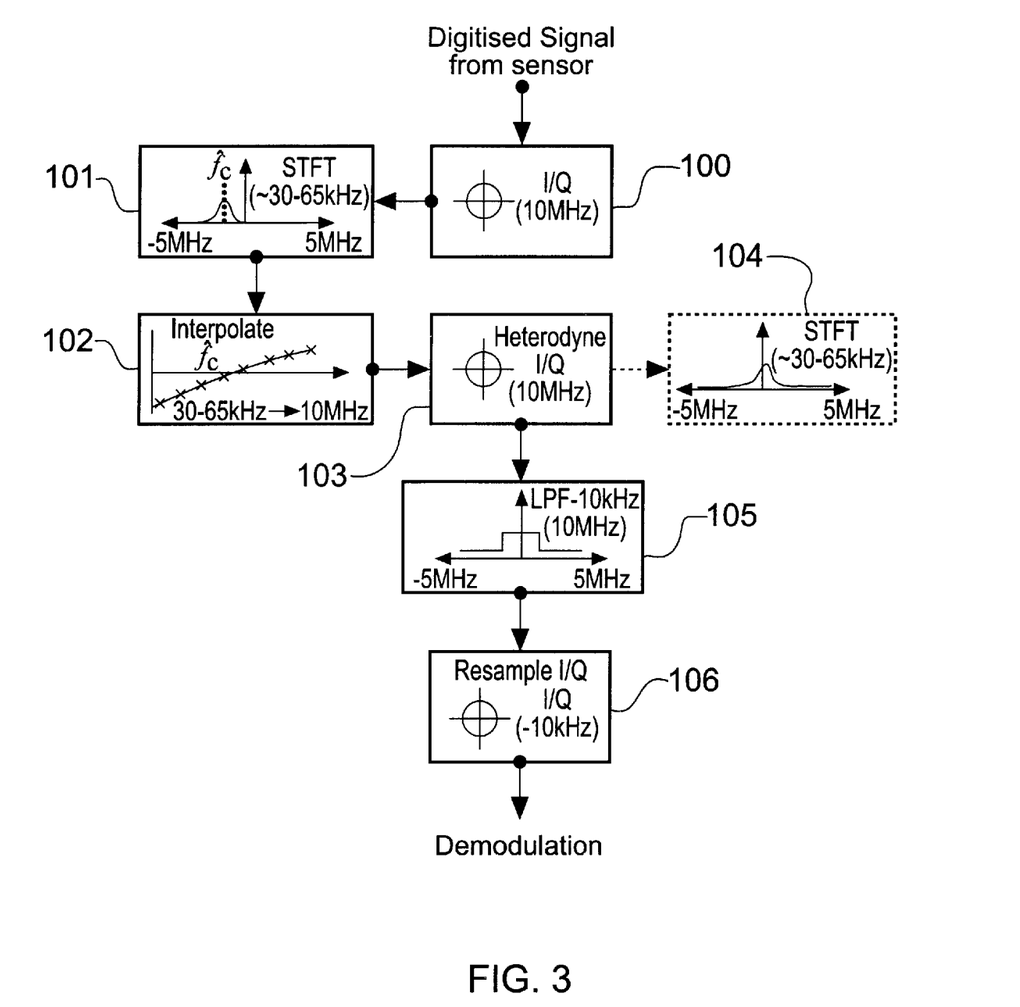
FIG. 3 is a block diagram showing stages in processing carried out by the embodiment of FIG. 1.

FIG. 3 is a schematic block diagram illustrating the processing step carried out in this embodiment of the present invention. In FIG. 3, it is assumed that the carrier frequency lies somewhere in the range from e.g. 5 MHz to 5 MHz and the micro-Doppler bandwidth does not exceed 10 kHz. FIG. 3 then illustrates steps of this processing.

In order to track the state of the object is i.e. the effect of its bulk movement, it is necessary to use some mathematical technique which enables values to be derived. Although many suitable techniques are known, this embodiment makes use of a Kalman filter.

Step 1 (100): the I-Q data at 10 MHz are shifted to the origin of the complex plane and output as time segments comprising a fixed number of discrete samples.

Step 2 (101): a time-frequency representation (TFR) is generated, for example using 64 samples per time segment, from which a single estimate of the carrier frequency, $f_c$ can be calculated or predicted.

Step 3 (102): the estimates are up-sampled by interpolation to match the 10 MHz sampling rate of the original I-Q series.

Step 4 (103): the original I-Q signal is down-converted to baseband by mixing it with the interpolated $f_c$ time-series. Box 4a shows the resulting spectrum of the shifted signal, but this would not be created during the actual processing.

Step 5 (105): the resulting baseband I-Q signal is low pass filtered in order to avoid subsequent aliasing problems.

Step 6 (106): the baseband I-Q is down-converted to a lower sampling rate, e.g. 10 kHz, suitable for demodulation.

Recursion is a major advantage of this overall tracking process; that is, data processed by the algorithm can be used again as input for a subsequent pass. The recursion enables the data to be visualised at each stage but also provides a tracking option which does not require the data to be reduced from its original large bandwidth down to that required for demodulation in one stage; although, of course, has real-time implications.

At regular time intervals measurements can be made which can be used to modify the current estimate of the 'state'. As the algorithm is recursive the complete history of the object does not need to be stored, thus making it suitable for real-time systems.

The basic model used in a discrete Kalman filter is:

$$X_{k+1} = \phi_k X_k + W_k$$

where $X_k$ is the state vector at time k, $\phi_k$ is known for continuous processes as the state transition matrix, and $W_k$ is a noise vector assumed to have a zero-mean Gaussian distribution. Measurements, $Z_k$, are made on the system and are assumed to have a linear relationship with the state vector, thus:

$$Z_k = H_k x_k + v$$

where $H_k$ is a matrix which relates the state vector to the measurement vector and $V_k$ is a vector which expresses the measurement error. The covariance matrices for the $W_k$ and $V_k$ vectors are typically noted by $Q_k$ and $R_k$ respectively.

Figure 4:
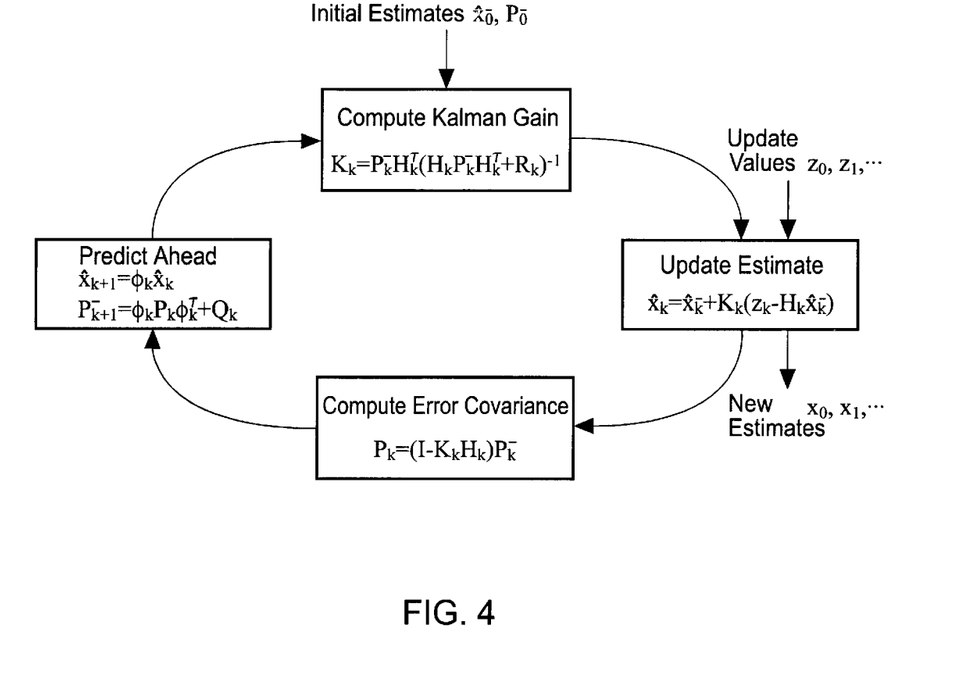
FIG. 4 is a block diagram illustrating the action of a Kalman filter in the embodiment of the present invention.

The general implementation of such a Kalman filter is shown in FIG. 4. In this embodiment, the state vector of the Kalman filter represents the position, velocity and acceleration of the carrier frequency track through time-frequency space. Each measurement represents the new estimate of the position of the track. For a given step size, Δt(which is the reciprocal of the sampling rate) the matrices $\phi_k$ and $Q_k$ are give $$\phi_k \begin{bmatrix} 1 & \Delta t & \frac{\Delta t^2}{2} \\ 0 & 1 & \Delta t \\ 0 & 0 & 1 \end{bmatrix}, Q_k = \begin{bmatrix} \frac{W}{20}\Delta t^5 & \frac{W}{8}\Delta t^4 & \frac{W}{6}\Delta t^3 \\ \frac{W}{8}\Delta t^4 & \frac{W}{3}\Delta t^3 & \frac{W}{2}\Delta t^2 \\ \frac{W}{6}\Delta t^3 & \frac{W}{2}\Delta t^2 & W\Delta t \end{bmatrix}$$

where W is a noise variance estimate.

As the result of the measurement vector consisting of only a single value, the Kalman filter update equations as shown in FIG. 4 are somewhat simplified. For example the matrix inversion required for the calculation of the Kalman filter gain reduces to a simple scalar expression. All the tracking that takes places occurs within the TFR, and Δt is set to match the update rate of the TFR. In the frequency axis, however, all the tracking is currently done in terms of cell position. This was chosen mainly for ease of implementation, but could be modified so that the Kalman filter tracks in frequency space if desired.

Two parameters are used to control the response of the Kalman filter when modeling a particular track, These parameters represent the level of uncertainty attached to the measurement values, and the smoothness of the fitted track. From tracking within the TFR using cell position, the uncertainty attached to any measurement is quite low (i.e 0.5 of cell at maximum).

The smoothness dictates the speed of response of the tracker, if the smoothness is a very low value then the track will be smooth.

A simple track processing algorithm may be used which prioritises all tracks identified by the Kalman filter tracker. This processing bounds the computational effort required so that the best track output (based on strength, length or a combination of the two) can be achieved in a practical time scale. Where more than one carrier exists, a sophisticated track association process is used to ensure that each new detection is associated with the proper track. The association uses the past frequency behaviour of the track (i.e. the state vector) as a guide.

In order to successfully translate the carrier frequency to baseband the frequency (and hence the net phase shift) of the mixing sinusoid must be known at each point in time. To achieve this, the discrete estimates of the carrier frequency generated by the tracker are interpolated using splines. This method of interpolation is relatively quick, as the interpolated value depends only on the local spline.

The calculation to translate the frequency content of a signal is given by:

$$Z_s(t)=z(t)exp(-2\pi i f_o t)$$

where $z_s(t)$ is the shifted complex signal and $f_o$ is the frequency of the constant mixing oscillator. If the frequency of the mixing oscillator is variable, as is the case for objects with non-constant bulk velocity, then the above expression for $Z_s(t)$ is modified to $$z_s(t) = z(t)\exp\left(-2\pi j \int_t f_t dt\right)$$

where $f_t$ is the oscillator's frequency at time t.

In order for Kalman filter described above to operate satisfactory, it is necessary to start the operation of that filter at a suitable value. Assuming that the initial state of the object 15 is not known, it is necessary to have a method of initializing the estimate of the carrier frequency. Therefore, in this embodiment; carrier frequency estimation is performed by peak detection—frequencies associated with TFR cells of highest energy are used as the estimates of $f_c$. In the general case, where only one carrier is present, the TFR cell of maximum intensity is used. This provides a rapid method which is reasonably robust to the effects of noise.

The carrier estimation process presupposes that at least one strong peak in each frequency spectrum exists, significant amplitude modulation effects may occur over short time-scales and therefore no peak may be apparent in the spectrum, or indeed across several rows of the TFR. The quality of the carrier frequency estimates is therefore a function of the CNR. If the CNR is above a threshold, then normal carrier estimation can occur.

The result is that the signal 19 from camera 18 may be analysed by the tracker unit 20 to prove an estimate of the effect of the bulk movement of the object 15 on the signal 19 and to track that bulk movement. It should be borne in mind that, since the object 15 represents a physical object in space, it is likely to undergo relatively smooth changes in velocity, and hence displacement. Discontinuous variation does not occur. As a result, it is possible to predict how the effect of the movement of the object 15 on the signal 19 will change, based on a preview of changes. this may be useful, for example, if noise levels on the signal rise to such a level that it is not possible, for a short period of time, to analyse the effects of the bulk movement in the way discussed above. When the signal becomes again suitable for analysis, this prediction gives a starting point for that analysis.

As mentioned above with reference to FIG. 3, it is then necessary to down-convert the original I-Q signal as mentioned at step 4 (103).

The down-conversion of the I-Q data is combined with digital Finite Impulse Response (fIR) filtering in an approach referred to as poly-phased filtering. This approach can be computationally very efficient, as redundant samples need not be manipulated in order to construct the output sequence. Out put samples are extracted from this signal at the desired output rate. Successive processed segments are then reassembled into a single, continuous, down-sampled, zero-frequency carrier I-Q stream maintaining phase continuity. The method of overlapping segments minimises end-effects caused by digitally filtering the time-series.

Once the tracker unit 20 has determined the effect of bulk movement of the object 15 on the signal 19, it is possible for the tracker 20 to output to a demodulator 21 the signal believed to be due to the vibration of the object 15. The demodulator 21 may then operate in the way described in the article by B. Ruck et al mentioned previously, and therefore will not be described here. The output of the demodulator 21 may then be suitable at analysis unit 22. At its simplest, that output analysis unit 22 may be a loudspeaker which generates a sound corresponding to the vibrations but more complex analysis of the signals to the output unit may be used.

What is claimed is:

1. A method of investigating vibrations of an object comprising:

generating coherent laser energy and causing some of the laser energy to be emitted towards an object;

receiving some of said emitted laser energy which is reflected from the object;

causing other of said generated laser energy to be mixed or interfere with the laser energy reflected from the object;

generating a signal corresponding to the interference thus caused;

analysing said signal to derive therefrom a frequency relating to bulk movement of said object;

deriving from said signal, another signal which is of restrictive bandwidth relative to said signal, said restrictive bandwidth encompassing said frequency and also encompassing frequencies of vibration of said object, and deriving from said another signal a further signal representing the vibrations of the object.

2. A method of investigating vibrations of an object according to claim 1, wherein said analysis to derive the frequency relating to the bulk movement of said object is recursive method, wherein an estimate of the current frequency relating to the bulk movement of the object is obtained from one or more previous estimates of that frequency, which estimates are themselves derived from said another signal.

3. A method of investigating vibrations of an object according to claim 2, wherein said recursive method uses only information from the immediately preceding estimate.

4. A method of investigating vibrations of an object according to claim 2, wherein said recursive method makes a prediction of the frequency relating to bulk movement within the immediately preceding estimate, and said prediction is compared with the frequency corresponding to the estimate of current movement.

5. A method of investigating vibrations of an object according to claim 2, wherein said recursive method involves the use of any one of Kalman filters, alpha-beta tracker techniques, path-following methods, graph-theory, hidden-Markov models, Bayesian techniques or stochastic resonance, at regular time intervals to modify the current estimate of the frequency relating to the bulk movement of the object.

6. A method of analysing vibrations of an object, as in any preceding claim, wherein said restrictive bandwidth is of the order of ±10 kHz.

7. An apparatus for investigating vibrations of an object, the apparatus comprising:
- a coherent laser source and means for directing some of the laser energy emitted from that source towards an object;
- a receiver for receiving laser energy reflected from said object;
- a mixer for mixing, or causing interference between, said reflected laser energy and other of said generated laser energy and generating a signal from the interference thus caused;
- an analyser for analysing the signal to derive therefrom a frequency relating to the bulk movement of said object, to derive another signal from said signal, which is of restrictive bandwidth relative to said signal, said restrictive bandwidth encompassing said frequency and also encompassing the frequencies of vibration of said object, and to derive from said another signal a further signal representing vibration of said object.

* * * * *